(12) United States Patent
Jol et al.

(10) Patent No.: US 8,388,385 B2
(45) Date of Patent: Mar. 5, 2013

(54) CONNECTOR ASSEMBLY

(75) Inventors: Eric S. Jol, San Jose, CA (US); Stephen Brian Lynch, Portola Valley, CA (US); Fletcher R. Rothkopf, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/098,367

(22) Filed: Apr. 29, 2011

(65) Prior Publication Data

US 2012/0051025 A1 Mar. 1, 2012

Related U.S. Application Data

(60) Provisional application No. 61/378,735, filed on Aug. 31, 2010.

(51) Int. Cl.
*H01R 24/00* (2011.01)
(52) U.S. Cl. ........................................................ 439/660
(58) Field of Classification Search ............ 439/607.28, 439/95, 607.35–607.4, 660, 676; 361/818
See application file for complete search history.

(56) References Cited

U.S. PATENT DOCUMENTS

| | | | | |
|---|---|---|---|---|
| 5,622,523 A | * | 4/1997 | Kan et al. | 439/607.37 |
| 5,685,739 A | * | 11/1997 | Davis et al. | 439/607.38 |
| 7,108,552 B2 | * | 9/2006 | Niitsu et al. | 439/607.35 |
| 7,305,253 B2 | | 12/2007 | Snyder et al. | |
| 7,435,110 B2 | * | 10/2008 | Xiao et al. | 439/107 |
| 7,697,281 B2 | * | 4/2010 | Dabov et al. | 361/679.55 |
| 7,758,379 B2 | * | 7/2010 | Chen | 439/607.11 |
| 7,869,206 B2 | * | 1/2011 | Dabov et al. | 361/679.55 |
| 8,011,956 B1 | * | 9/2011 | Yang et al. | 439/589 |
| 8,023,261 B2 | * | 9/2011 | Sanford et al. | 361/679.55 |
| 2007/0058832 A1 | | 3/2007 | Hug et al. | |
| 2008/0294923 A1 | | 11/2008 | Barake et al. | |
| 2010/0061040 A1 | * | 3/2010 | Dabov et al. | 361/679.01 |
| 2010/0061055 A1 | * | 3/2010 | Dabov et al. | 361/679.56 |
| 2010/0215183 A1 | | 8/2010 | Hansson et al. | |
| 2011/0076883 A1 | * | 3/2011 | Jol | 439/521 |
| 2011/0081022 A1 | * | 4/2011 | Tamm et al. | 381/1 |
| 2012/0051025 A1 | * | 3/2012 | Jol et al. | 361/818 |
| 2012/0052724 A1 | * | 3/2012 | Jol | 439/587 |
| 2012/0264337 A1 | * | 10/2012 | Gross | 439/660 |

* cited by examiner

*Primary Examiner* — Ross Gushi

(57) ABSTRACT

A personal media device includes at least a housing having at least a highly curved portion. The housing includes at least one opening suitably sized to accommodate a multi-pin connector. A portion of the multi-pin adapter associated with the highly curved portion includes at least a spring loaded, small form factor, electrical contact arranged to provide EMI ground contact when a plug is inserted into and engages the multi-pin connector assembly. In one embodiment, the spring loaded electrical contact takes the form of a dimple formed of conductive material such as stainless steel or copper.

13 Claims, 10 Drawing Sheets

CONNECTOR ASSEMBLY

CROSS-REFERENCE TO RELATED APPLICATIONS

This application claims priority to each of U.S. Provisional Patent Application No. 61/378,735, filed Aug. 31, 2010, entitled "PROVIDING GROUNDING SUPPORT FOR A CONNECTOR ASSEMBLY" by Jol et. al. which is also incorporated by reference in its entirety.

TECHNICAL FIELD

The described embodiments relate generally to small form factor electronic devices. More particularly, providing grounding support for a connector is described.

DESCRIPTION OF THE RELATED ART

The outward appearance of a small form factor electronic device, including its design and its heft can be important factors in determining a user's overall appreciation of the product. For example, the outward appearance and perceived quality of the device functionality can contribute to the overall impression that the user has of the small form factor electronic device. At the same time, the assembly of the small form factor electronic device is also an important consideration as a durable assembly helps to extend the overall life of the small form factor electronic device thereby increasing its value to the user.

One design challenge associated with the small form factor electronic device is the design of the enclosures used to house the various internal components. This design challenge generally arises from a number conflicting design goals that includes the desirability of making the enclosure lighter and thinner, the desirability of making the enclosure stronger and making the enclosure more esthetically pleasing. The lighter enclosures, which typically use thinner plastic structures and fewer fasteners, tend to be more flexible and therefore they have a greater propensity to buckle and bow when used while the stronger and more rigid enclosures, which typically use thicker plastic structures and more fasteners, tend to be thicker and carry more weight. Unfortunately, increased weight can lead to user dissatisfaction, and bowing can damage the internal parts.

The shape of the housing can also be such that the housing easily fits into a user's hand. This shape can be challenging when attempting to provide openings used to accommodate input/output devices such as connectors, audio ports, etc.

Therefore providing suitable openings in a highly curved housing used to support a small form factor electronic device is desirable.

SUMMARY OF THE DESCRIBED EMBODIMENTS

In one embodiment, a multi-pin connector assembly is described. The multi-pin connector assembly is arranged to facilitate an electrical connection between an electronic device and an external circuit. The multi-pin connector assembly includes at least an electrically insulating enclosure having a size and shape arranged to mechanically engage a connector plug in an engaged state, the connector plug having an electrically conductive body. In the described embodiment, the electrically insulating enclosure includes at least a top portion having at least two leaf type contacts arranged to provide electrical connections to corresponding ground tabs on the connector plug body in the engaged state, and a bottom portion having at least two ground contacts formed of highly conductive material each mechanically coupled to a spring assembly. In the engaged state, the spring assembly applies a spring force Fspring to the at least two ground contacts causing the at least two ground contacts to make electrical contact with the connector plug body.

In another embodiment, a personal media device is described. The personal media device includes at least a housing having at least a highly curved portion wherein the housing includes at least one opening suitably sized to accommodate a multi-pin connector and a multi-pin connector assembly at least a part of which is associated with the highly curved portion of the housing. In the described embodiment, the part of the multi-pin connector assembly associated with the highly curved portion of the housing includes at least a spring loaded, small form factor, electrical contact assembly arranged to provide EMI ground contact between the multi-pin connector assembly and a conductive shell of a connector plug when the connector plug is inserted into and engages the multi-pin connector assembly.

In yet another embodiment, a method of manufacturing an electronic device, is described. The method can be carried out by performing at least the following operations. Providing a housing having at least a highly curved portion, forming at least one opening in the highly curved portion of the housing suitably sized to accommodate a multi-pin connector, providing the multi-pin connector assembly, inserting the multi-pin connector assembly into the opening, and securing the multi-pin connector to highly curved portion of the housing. In the described embodiment, the multi-pin connector includes an electrically insulating enclosure having a size and shape arranged to mechanically engage a connector plug in an engaged state to form an electrical connection between internal circuits in the electronic device and an external circuit, the connector plug having an electrically conductive body for providing a ground. The enclosure, in turn, includes a top portion having at least two leaf type contacts arranged to provide electrical connections to corresponding ground tabs on the connector plug body in the engaged state, and a bottom portion having at least two ground contacts formed of highly conductive material each mechanically coupled to a spring assembly, wherein in the engaged state, the spring assembly applies a spring force Fspring to the at least two ground contacts causing the at least two ground contacts to make electrical contact with the connector plug body.

Other apparatuses, methods, features and advantages of the described embodiments will be or will become apparent to one with skill in the art upon examination of the following figures and detailed description. It is target that all such additional apparatuses, methods, features and advantages be included within this description be within the scope of and protected by the accompanying claims.

BRIEF DESCRIPTION OF THE DRAWINGS

The described embodiments and the advantages thereof can best be understood by reference to the following description taken in conjunction with the accompanying drawings.

DETAILED DESCRIPTION OF REPRESENTATIVE EMBODIMENTS

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

Aspects of the described embodiments relate to a small form factor electronic product. For the remainder of this discussion, the small form factor electronic device will be described in terms of a personal media device. The personal media device can include housing suitable for enclosing and supporting various operational components. The housing can support various input/output mechanisms such as volume switches, power buttons, data and power connectors, audio jacks and the like. The housing can include openings to accommodate the input/output mechanisms. The locations at which the input/output mechanisms are placed can be selected to enhance the usability of the interface under conditions for which the device is intended to operate. For instance, for a device intended to be operated with a single hand, the input mechanisms, such as an audio control switch, can be placed at a location that are easily finger operated while the device is held in the palm of the hand. Other output mechanisms, such as an audio jack, can be placed at locations that do not interfere with holding the device, such as on a top edge of the device.

Device components that connect to and allow the personal media device to operate for its intended functions can be packaged within the enclosure. Some flexibility can be afforded in regards to the locations of the internal device components as long as sufficient space for needed connectors between components is available. Also, approaches, such as custom-shaped printed circuit boards (PCBs) or batteries can be employed to allow available internal spaces to be efficiently utilized. A connector assembly used to accommodate the connector port can be widely varied. For example, the connector assembly can take the form of a data/power connector (such as a standard 30 pin type connector). The connector assembly can also be associated with an output device such as an audio jack having an audio jack barrel with a size and shape in accordance with an audio post. The audio post can be inserted into the audio jack barrel. In this way electrical contacts on the audio post engage corresponding contact pads on an interior surface of the audio jack barrel allowing electrical signals to pass between an external circuit (such as headphones) and the personal media device. Typically, when the audio post is inserted into the audio jack barrel, the acoustic speakers are disabled such that the insertion of the audio jack into the audio jack barrel does not interfere with the outputting of audible sound.

These and other embodiments are discussed below with reference to FIGS. 1-11. However, those skilled in the art will readily appreciate that the detailed description given herein with respect to these figures is for explanatory purposes only and should not be construed as limiting.

Figures 1, 2:
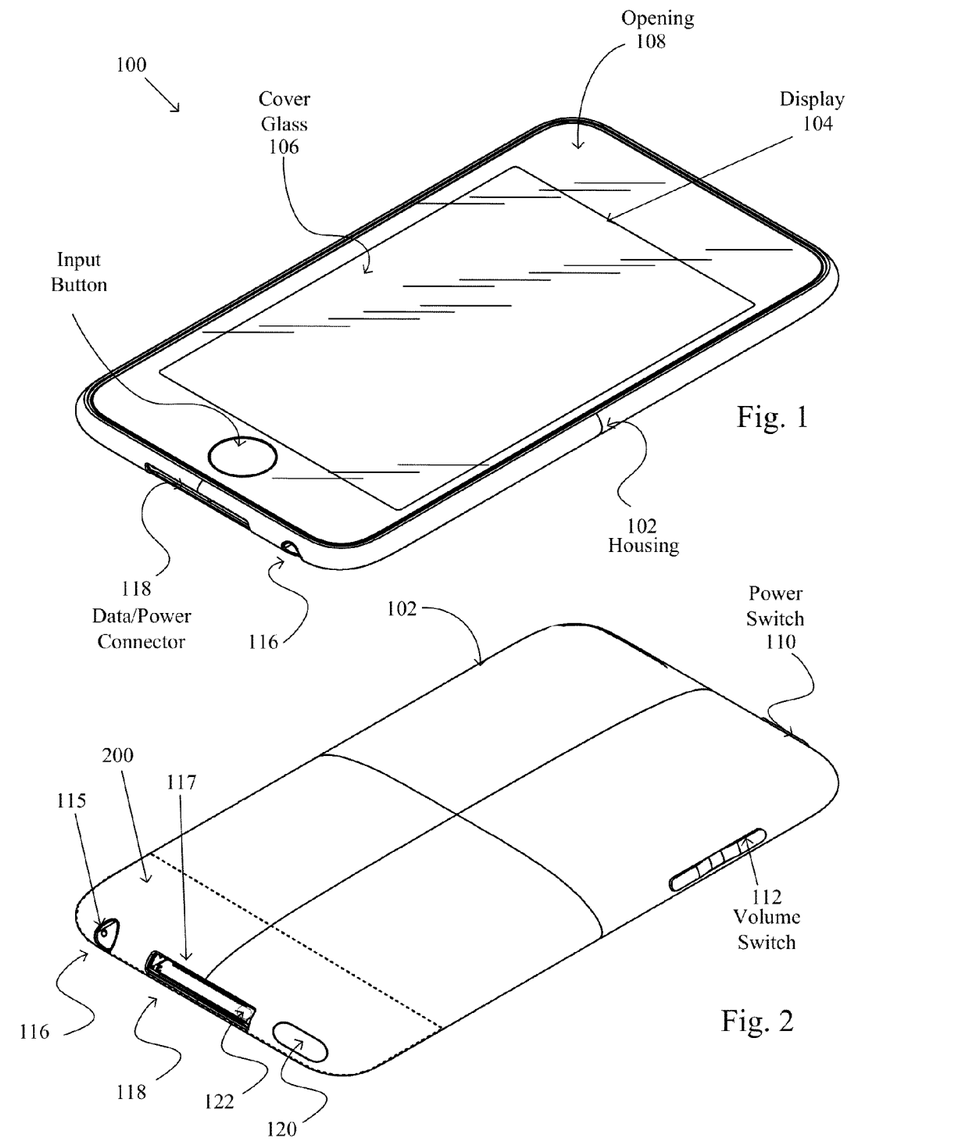
FIGS. 1-2 are perspective diagrams showing various views of fully assembled personal media device in accordance with an embodiment of the invention.

FIGS. 1-2 are perspective diagrams showing various views of fully assembled personal media device 100 in accordance with an embodiment of the invention. Personal media device 100 can be sized for one-handed operation and placement into small areas such as a pocket, i.e., personal media device 100 can be a handheld pocket sized electronic device. By way of example, personal media device 100 can correspond to a computer, media device, telecommunication device and/or the like. Personal media device 100 is capable of processing data and more particularly media such as audio. Personal media device 100 can generally correspond to a music player, game player, video player, personal digital assistant (PDA), and/or the like. With regards to being handheld, personal media device 100 can be operated solely by the user's hand (s), i.e., no reference surface such as a desktop is needed. In some cases, the handheld device is sized for placement into a pocket of the user. By being pocket sized, the user does not have to directly carry the device and therefore the device can be taken almost anywhere the user travels (e.g., the user is not limited by carrying a large, bulky and heavy device).

Personal media device 100 can be widely varied. In some embodiments, personal media device 100 can perform a single function (e.g., a device dedicated to playing and storing media) and, in other cases, the personal media device can perform multiple functions (e.g., a device that plays/stores media, receives/transmits telephone calls/text messages/internet, and/or performs web browsing). Personal media device 100 is capable of communicating wirelessly (with or without the aid of a wireless enabling accessory system) and/or via wired pathways (e.g., using traditional electrical wires). In some embodiments, personal media device 100 can be extremely portable (e.g., small form factor, thin, low profile, lightweight). Personal media device 100 can even be sized for one-handed operation and placement into small areas such as a pocket, i.e., personal media device 100 can be a handheld pocket sized electronic device. Personal media device 100 can correspond to any of those electronic devices an iPod™, or an iPhone™ available by Apple Inc. of Cupertino, Calif.

Personal media device 100 can include housing 102 configured to at least partially enclose any suitable number of components associated with personal media device 100. For example, housing 102 can enclose and support internally various electrical components (including integrated circuit chips and other circuitry) to provide computing operations for the device. The integrated circuit chips and other circuitry can include a microprocessor, memory, a battery, a circuit board, I/O, various input/output (I/O) support circuitry and the like. Although not shown in this figure, housing 102 can define a cavity within which the components can be positioned and housing 102 also can physically support any suitable number of mechanisms, within housing 102 or within openings through the surface of housing 102.

In addition to the above, housing 102 can also define at least in part the outward appearance of personal media device 100. That is, the shape and form of housing 102 can help define the overall shape and form of personal media device 100 or the contour of housing 102 can embody the outward physical appearance of personal media device 100. Any suitable shape can be used. In some embodiments, the size and shape of housing 102 can be dimensioned to fit comfortably within a user's hand. In some embodiments, the shape includes a slightly curved back surface and highly curved side surfaces. Housing 102 is integrally formed in such as way as to constitute is a single complete unit. By being integrally formed, housing 102 has a seamless appearance unlike conventional housings that include two parts that are fastened together thereby forming a reveal, a seam there between. That is, unlike conventional housings, housing 102 does not include any breaks thereby making it stronger and more aesthetically pleasing. Housing 102 can be formed of any number of materials including for example plastics, metals, ceramics and the like. In one embodiment, housing 102 can be formed of stainless steel in order to provide an aesthetic and appealing look and feel as well as provide structural integrity and support for all sub-assemblies installed therein. When metal, housing 102 can be formed using conventional collapsible core metal forming techniques well known to those skilled in the art.

Personal media device 100 also includes cover 106 that includes a planar outer surface. The outer surface can for example be flush with an edge of the housing wall that surrounds the edge of the cover. Cover 106 cooperates with housing 102 to enclose personal media device 100. Although cover 106 can be situated in a variety of ways relative to the housing, in the illustrated embodiment, cover 106 is disposed within and proximate the mouth of the cavity of housing 102. That is, cover 106 fits into an opening 108. In an alternate embodiment, cover 106 can be opaque and can include touch sensing mechanism that forms a touch pad. Cover 106 can be configured to define/carry the user interface of personal media device 100. Cover 106 can provide a viewing region for display assembly 104 used to display a graphical user interface (GUI) as well as other information to the user (e.g., text, objects, and graphics). Display assembly 104 can be assembled and contained within housing 102. Such user input events can be used for any number of purposes, such as resetting personal media device 100, selecting between display screens presented on display assembly 104, and so on. In one embodiment, cover 106 is a protective top layer of transparent or semitransparent material (clear) such that display assembly 104 is visible there-through. That is, cover 106 serves as a window for display assembly 104 (i.e., the transparent cover overlays the display screen). In one particular embodiment, cover 106 is formed from glass (e.g., cover glass), and more particularly highly polished glass. It should be appreciated, however, that other transparent materials such as clear plastic can be used.

The viewing region can be touch sensitive for receiving one or more touch inputs that help control various aspects of what is being displayed on the display screen. In some cases, the one or more inputs can be simultaneously received (e.g., multi-touch). In these embodiments, a touch sensing layer (not shown) can be located below the cover glass 106. The touch sensing layer can for example be disposed between the cover glass 106 and the display assembly 104. In some cases, the touch sensing layer is applied to display assembly 104 while in other cases the touch sensing layer is applied to the cover glass 106. The touch sensing layer can for example be attached to the inner surface of the cover glass 106 (printed, deposited, laminated or otherwise bonded thereto). The touch sensing layer generally includes a plurality of sensors that are configured to activate as the finger touches the upper surface of the cover glass 106. In the simplest case, an electrical signal is produced each time the finger passes a sensor. The number of signals in a given time frame can indicate location, direction, speed and acceleration of the finger on the touch sensitive portion, i.e., the more signals, the more the user moved his or her finger. In most cases, the signals are monitored by an electronic interface that converts the number, combination and frequency of the signals into location, direction, speed and acceleration information. This information can then be used by the personal media device 100 to perform the desired control function relative to display assembly 104.

Personal media device 100 can also include one or more switches including power switches, volume control switches, user input devices and the like. Power switch 110 can be configured to turn personal media device 100 on and off, whereas volume switches 112 is configured to modify the volume level produced by the personal media device 100. Personal media device 100 can also include one or more connectors for transferring data and/or power to and from personal media device 100. For example, opening 115 can accommodate audio jack 116 whereas opening 117 can accommodate data/power connector 118. Audio jack 116 allows audio information to be outputted from personal media device 100 by way of a wired connector whereas connector 118 allows data to be transmitted and received to and from a host device such as a general purpose computer (e.g., desktop computer, portable computer). Connector 118 can be used to upload or down load audio, video and other image data as well as operating systems, applications and the like to and from personal media device 100. For example, connector 118 can be used to download songs and play lists, audio books, photos, and the like into the storage mechanism (memory) of personal media device 100. Connector 118 also allows power to be delivered to personal media device 100.

Portion 200 of personal media device 100 can include a number of communication features. For example, portion 200 can include at least first audio port 120 that can be used to output a first portion of audible sound generated by an audible sound generator assembly enclosed within housing 102. The audible sound generator assembly can take many forms. In the described embodiment, however, the audible sound generator assembly includes at least a diaphragm arranged to synchronously vibrate with audio signals provided by a processing unit included in personal media device 100. The audio signals can be provided by the processing unit decoding audio data files retained within personal media device 100. Enclosed within connector assembly 118, second audio port 122 can be used to output a remaining portion of the audible sound generated by the audible sound generator assembly. In this way, first audio port 120 and second audio port 122 can cooperatively output the audible sound generated by the audible sound generator assembly. By cooperative it is meant that when, for example, first audio port 120 is blocked or otherwise obstructed (by a finger, clothing, etc.), the placement of second audio port 122 substantially precludes the likelihood that second audio port 122 will also be blocked. Therefore, since first audio port 120 and second audio port 122 share an air path from the audible sound generator to the external environment, when one portion of the air path (that portion associated with first audio port 120, for example) is blocked or otherwise obstructed, at least some of the first portion of audible sound generated by the audible sound generator assembly can be passively re-directed to second audio port 122 thereby substantially preserving an overall perceived sound output level.

Figure 3:
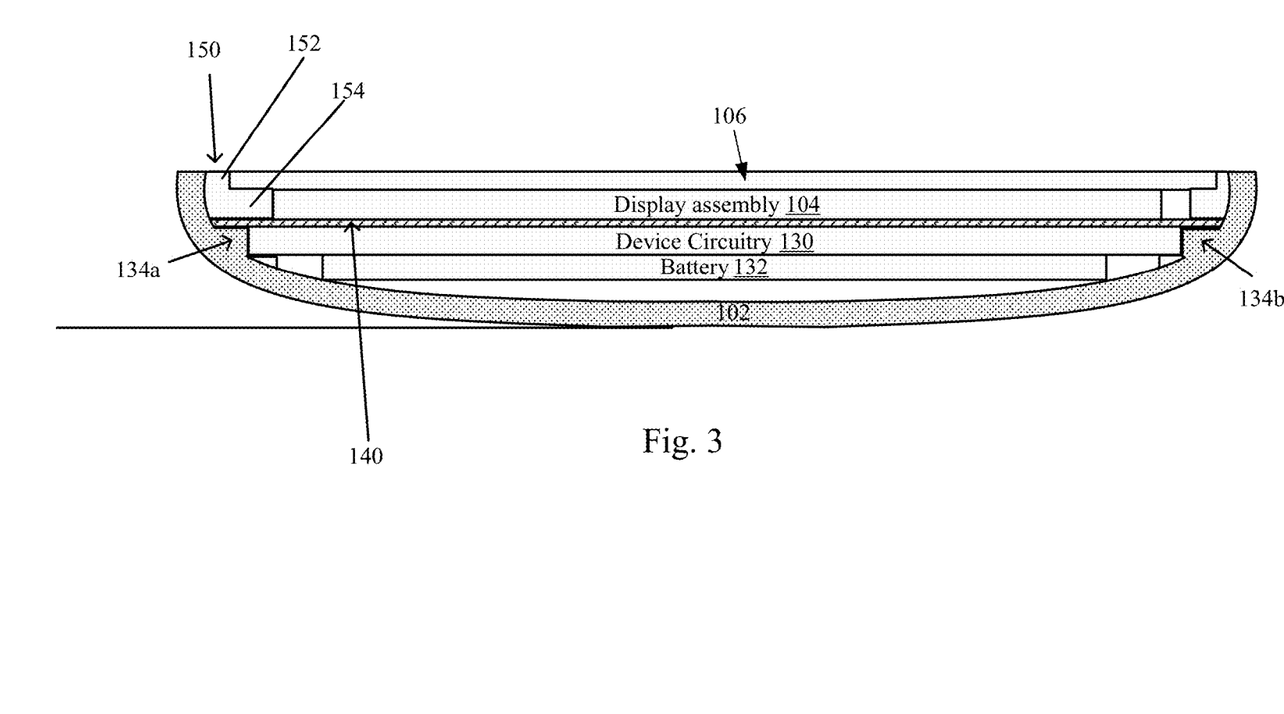
FIG. 3 is a side view of personal media device in accordance with the described embodiments.

FIG. 3 shows a cross-sectional view of a portable electronic device 100 shown in FIGS. 1-2. Housing 102 can enclose various internal device components such as those associated with the user interface that allow personal media device 100 to operate for its intended functions. For the purposes of discussion, the internal device components can be considered to be arranged in a number of stacked layers. For example, a display screen of the display assembly 104 can be located directly below the top glass 106. In one embodiment, the display screen and its associated display driver circuitry can be packaged together as part of the display assembly 104. Below display assembly 104, device circuitry 130, such as a main logic board or circuitry associated with other components, and a battery 132, which provides power to personal media device 100, can be located.

Internal frame 140 can add to the overall stiffness of personal media device 100 by, for example, enhancing an ability to resist bending moments experienced by housing 102. Internal frame 140 can be formed of many strong and resilient materials. For example when internal frame 140 is formed of metal such as stainless steel, internal frame 140 can be referred to as M(etal)-frame 140. M-frame 140 can provide both structural support for personal media device 100 but also act to aid in the transfer of heat generated by the various internal components to the external environment. M-frame 140 can be located below the display assembly 104 and above the device circuitry 130. In this way, M-frame 140 can provide support for various internal components as well as aid in transferring heat from internal components such as display assembly 104.

M-frame 140 can be used as an attachment point for other device components. For example, M-frame 140 can be attached to mounting surface, such as 134a and 134b, on housing 102 via fasteners or using a bonding agent. Then, other device components, such as display assembly 104 can be coupled to M-frame 140 rather than directly to housing 102. One advantage of coupling display assembly 104 to the housing via M-frame 140 is that display 140 can be somewhat isolated from bending moments associated with housing 102, i.e., bending moments generated on the housing can be dissipated into M-frame 140. Isolating the display assembly 104 from bending moments associated with housing 102 can prevent damage to display assembly 104, such as cracking, from occurring.

It should be noted that in some embodiments, personal media device 100 can include additional internal frames. For example, frame 150 can be affixed directly to housing 102 and generally may act to support top glass 106. In this regard, frame 150 can be referred to as G(lass)-frame 150. In order to support cover glass 106, G-frame 150 can include rim 152 having flange portion 154 where cover glass 106 is glued to rim 152 about flange 154, thus sealing the entire device. G-frame 150 can be made of an electrically non-conductive frame material, such as a glass filled plastic. One example glass-filled plastic suitable for use in G-frame 150 is KALIX™, manufactured by Solvay Advanced Polymers of Alpharetta, Ga. KALIX™ includes 50% glass-fiber reinforced high-performance nylon. One of ordinary skill in the art will recognize that there are many other potential frame materials that would be suitable for use with this embodiment, and the claims should not be construed as being limited to KALIX™ or any other glass-filled plastic unless expressly stated.

Figure 4:
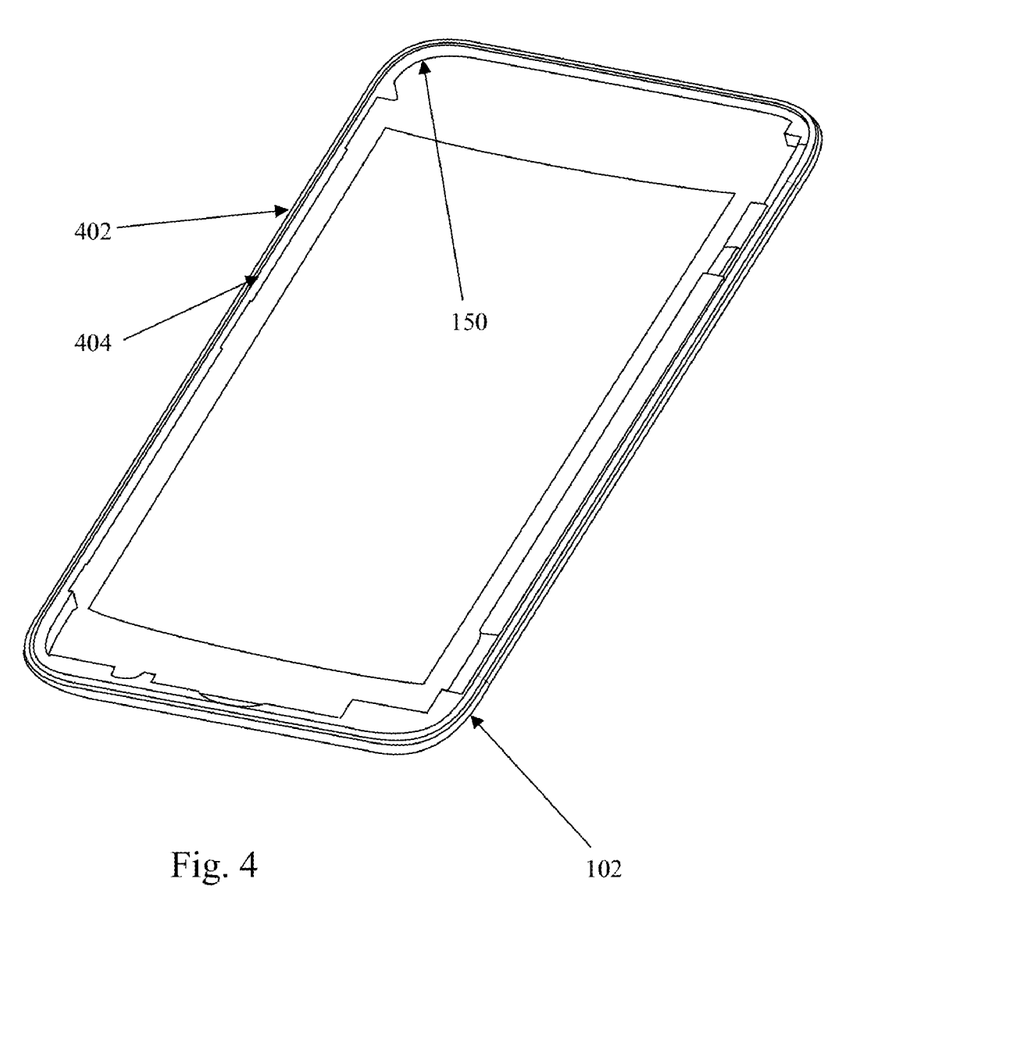
FIG. 4 shows a top view of interior of housing showing G-frame in more detail.

FIG. 4 shows a top view of interior of housing 102 showing G-frame 150 in more detail. Here, housing 102 is provided, which is made of an electrically conductive material. An example of an electrically conductive material suitable for use with this embodiment is stainless steel, although one of ordinary skill in the art will recognize that there are many other potential materials that would be suitable with this embodiment and the claims should not be construed as being limited to stainless steel unless expressly stated. G-Frame 150 is affixed to housing 102, and generally may act to support a front face (not pictured) of the device. The front face may be made of transparent material, such as glass, and may act to cover the device, yet permit a user to view through the cover to a display (not pictured) underneath. This display may also act as an input device. For example, the display may be one of many different types of touch screens. In order to support the cover, G-frame 150 may include rim 402 having flange portion 404. In one embodiment, the cover is glued to rim 402 about flange 404, thus sealing the entire device. Thus, rim 402 acts not only as a support for the cover but also as a junction area where the cover may be affixed to the frame.

Figure 5:
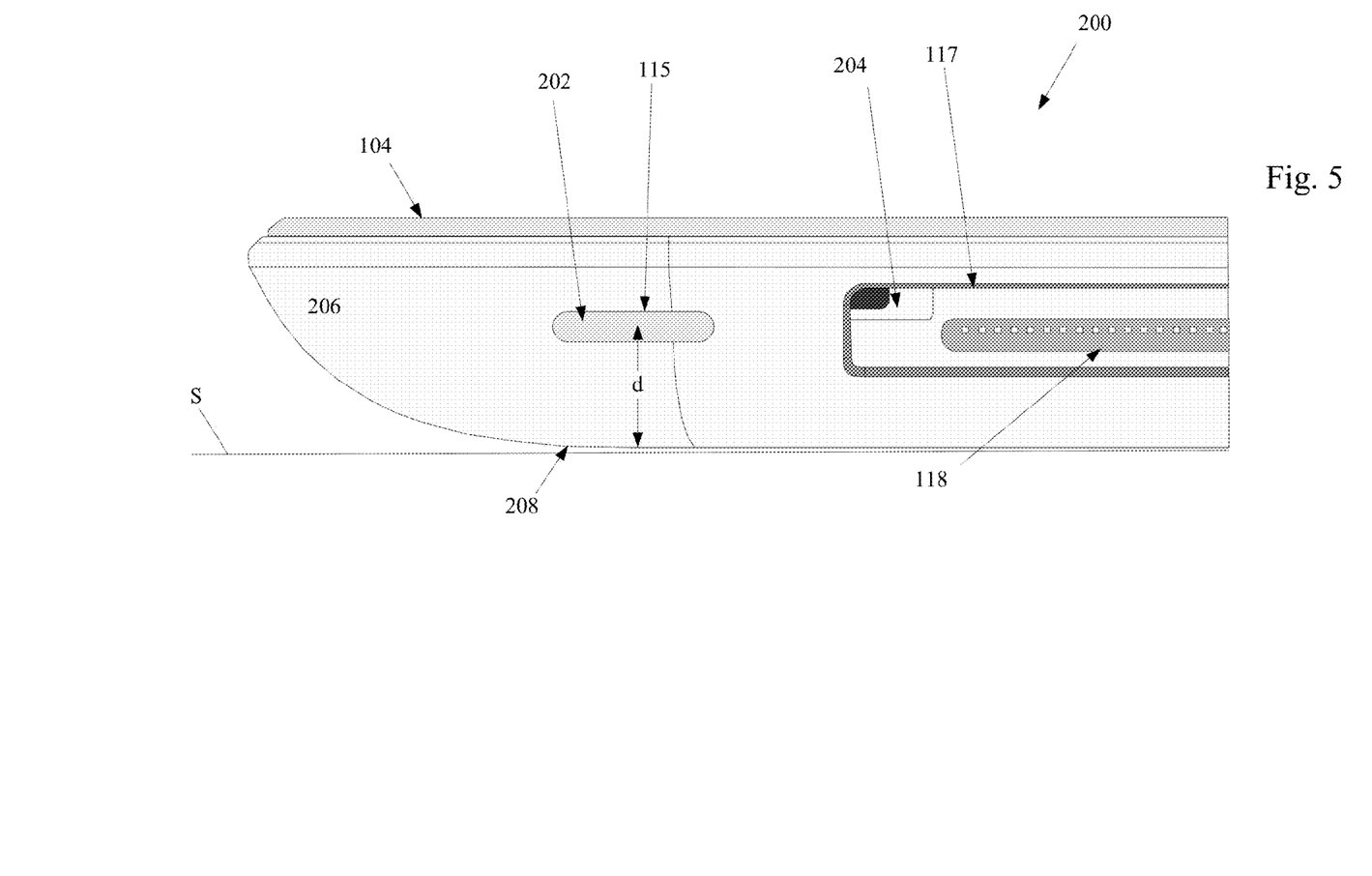
FIG. 5 shows an enlarged view of a portion of housing shown in FIG. 2 viewed in a head on perspective showing connector assembly in accordance with the described embodiments.

FIG. 5 shows an enlarged view of portion 200 of housing 102 shown in FIG. 2 viewed head on. For the remainder of this discussion and without loss of generality, first audio port 120 will be referred to as housing port 202 and second audio port 120 as connector port 204. Housing port 202 can have a size and shape in keeping with the overall shape and appearance of housing 102. For example, side walls 206 of housing 102 can have a spline, or curved shape that facilitates a user holding personal media device 100 in a hand. Accordingly, housing port 202 can be shaped to more readily blend in with the shape of sidewalls 206. Housing port 202 can be located distance "d" from rear surface 208 of housing 102.

Figure 6:
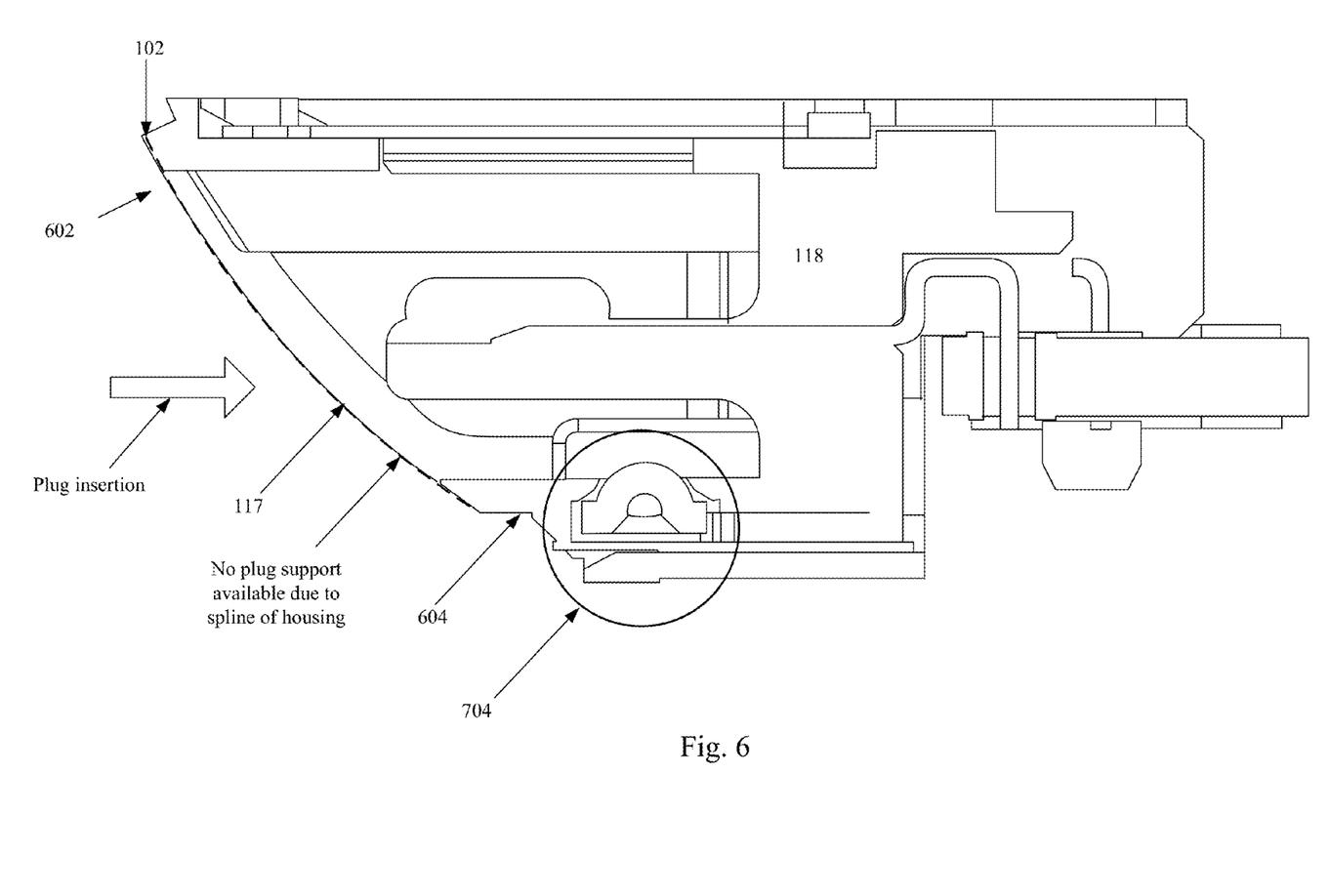
FIG. 6 shows a cross sectional view of connector assembly showing the relationship of connector assembly and the spline shape of housing.
Figure 7:
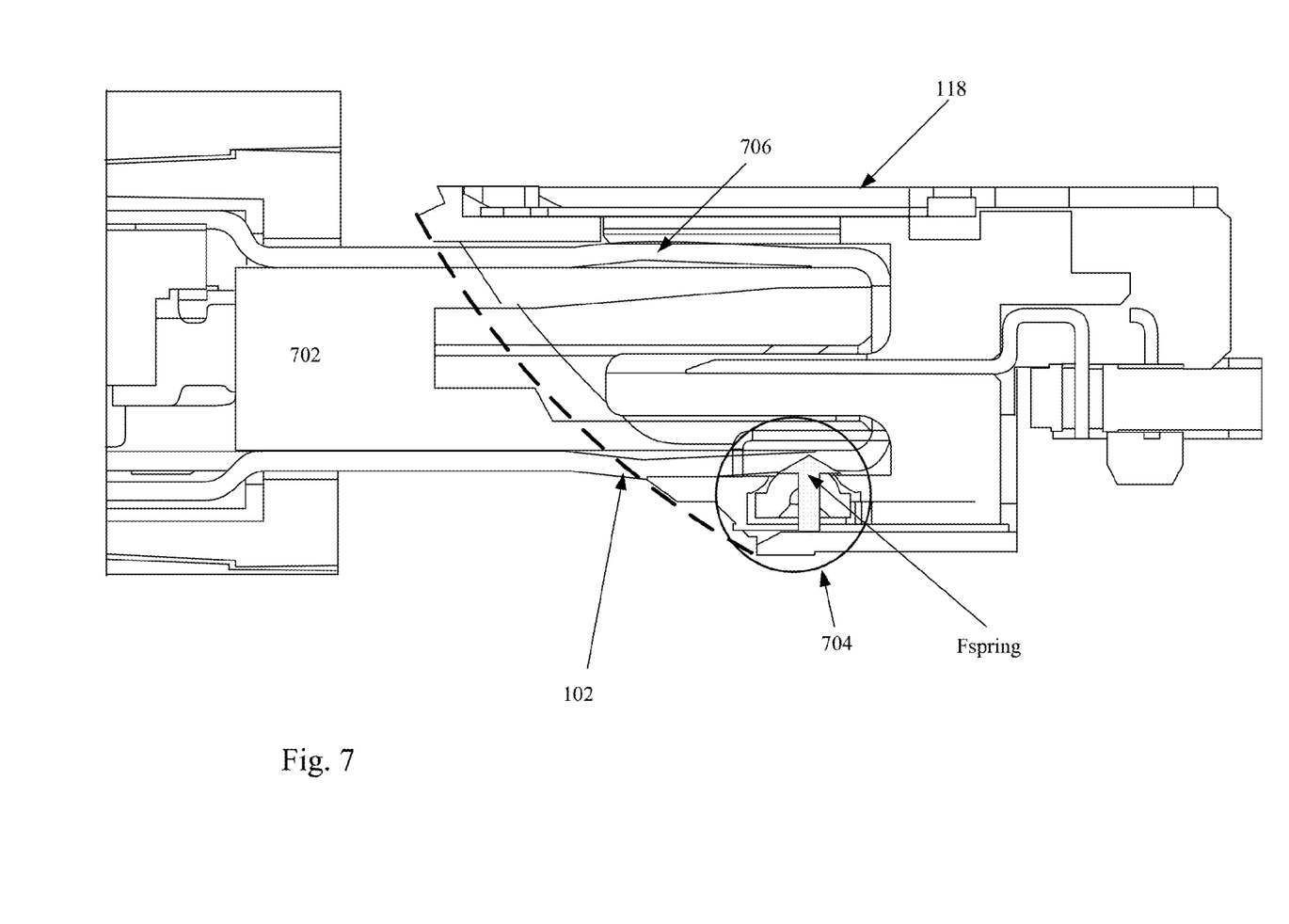
FIG. 7 shows a cross sectional view of connector assembly showing the relationship of connector assembly and the spline shape of housing with inserted connector plug.

FIG. 6 shows a cross sectional view of connector assembly 118 showing the relationship of connector assembly 118 and the spline shape of housing 102. As can be seen, due to the shape of housing 102, the portion of connector 118 has a limited depth of engagement with regards to housing 102. For example, top portion 602 can accommodate more of a connector plug than bottom portion 604. Due to this reduced amount of support, ground tabs on a connector plug cannot make an adequate electrical connection with ground contacts that would otherwise be available at bottom portion 604. Therefore, as shown in FIG. 7, in order to maintain at least four ground connections between connector plug 702 and connector assembly 118, at least two spring activated ground contacts 704 can be provided at bottom portion 604 of connector assembly 118. In the described embodiment, spring activated ground contacts can take the form of dimples 704 formed of highly conductive material along the lines of stainless steel, copper, and so forth. In addition to spring activated dimples 704, at least two additional leaf type contacts 706 can be provided at top portion 602. In this way, at least four EMI ground tabs can be provided by connector assembly 118. In order to assure that overall contact resistance is minimized in spite of the reduced contact area presented by dimples 704, spring force Fspring can be in the range of about 150 grams or thereabout. Dimples 704 can protrude through a plastic body of connector assembly 118 and make contact with metal housing of plug 702 shown in FIG. 8.

Figure 8:
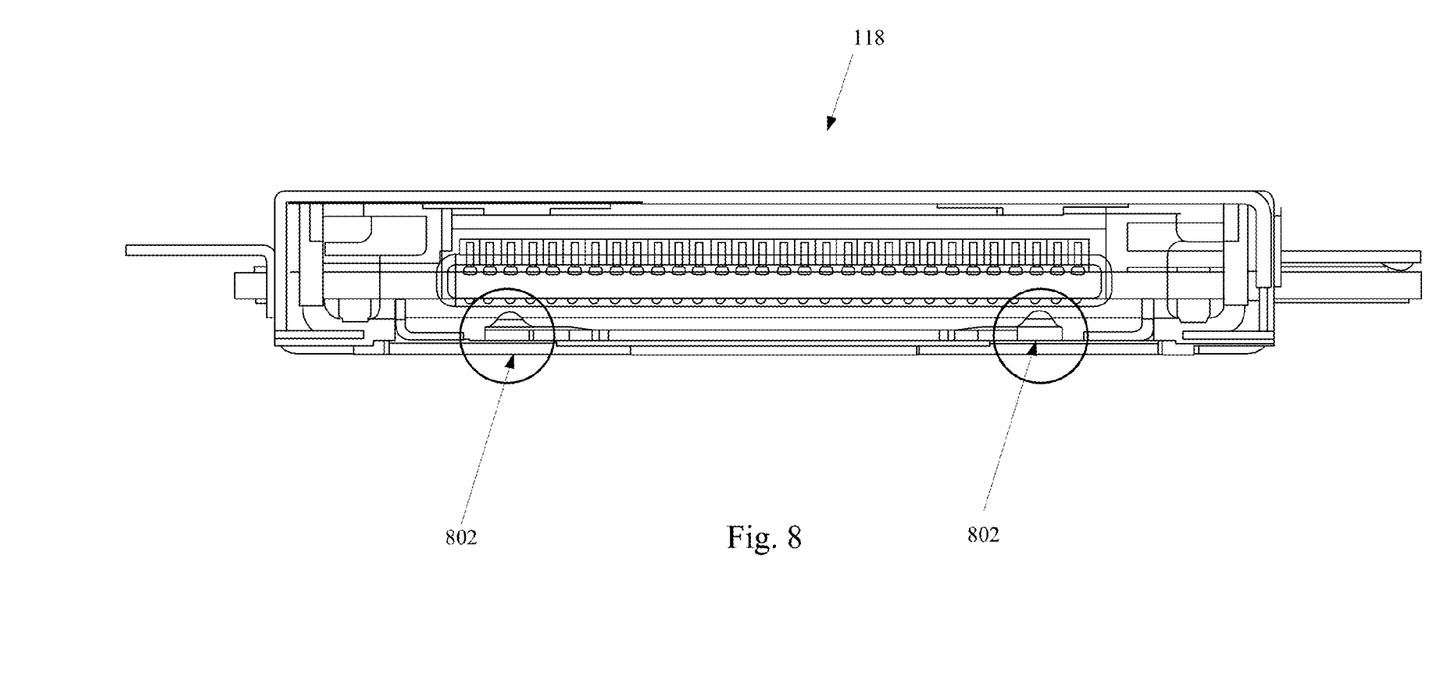
FIG. 8 shows interior view of connector assembly showing contact pads associated with spring activated dimples.

FIG. 8 shows an interior head on view of connector assembly 118 showing contact pads 802 corresponding to dimples 704. Contact pads 802 make direct contact with the metal shell of plug 702. Connector assembly 118 has pins 220.

Figure 9:
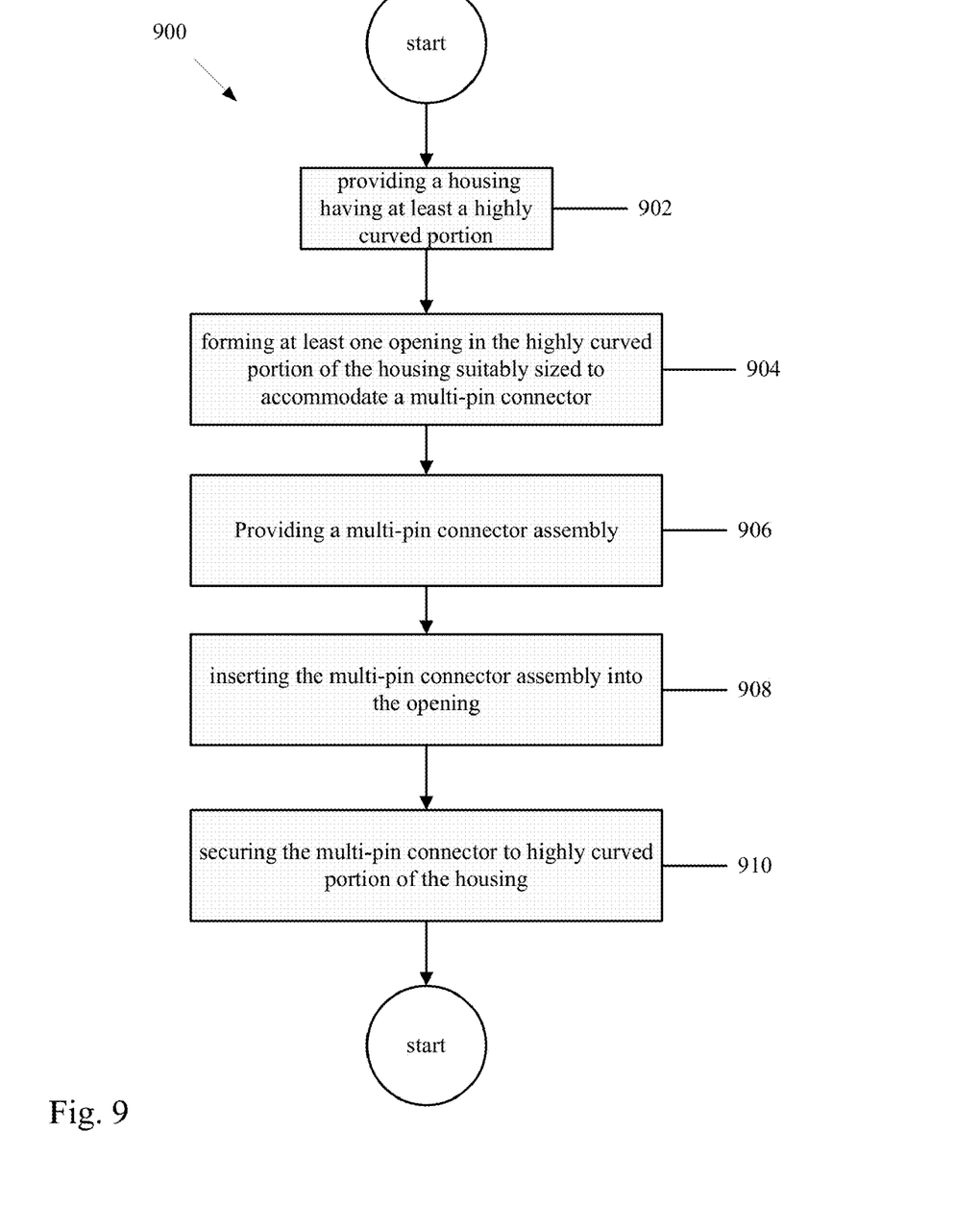
FIG. 9 shows a flowchart detailing a process for manufacturing an electronic device in accordance with the described embodiments.

FIG. 9 shows a flowchart detailing process 900 for manufacturing an electronic device in accordance with the described embodiments. Process 900 can be carried out by providing a housing having at least a highly curved portion at 902, forming at least one opening in the highly curved portion of the housing suitably sized to accommodate a multi-pin connector at 904, providing the multi-pin connector assembly at 906, inserting the multi-pin connector assembly into the opening at 908; and securing the multi-pin connector to highly curved portion of the housing at 910.

Figure 10:
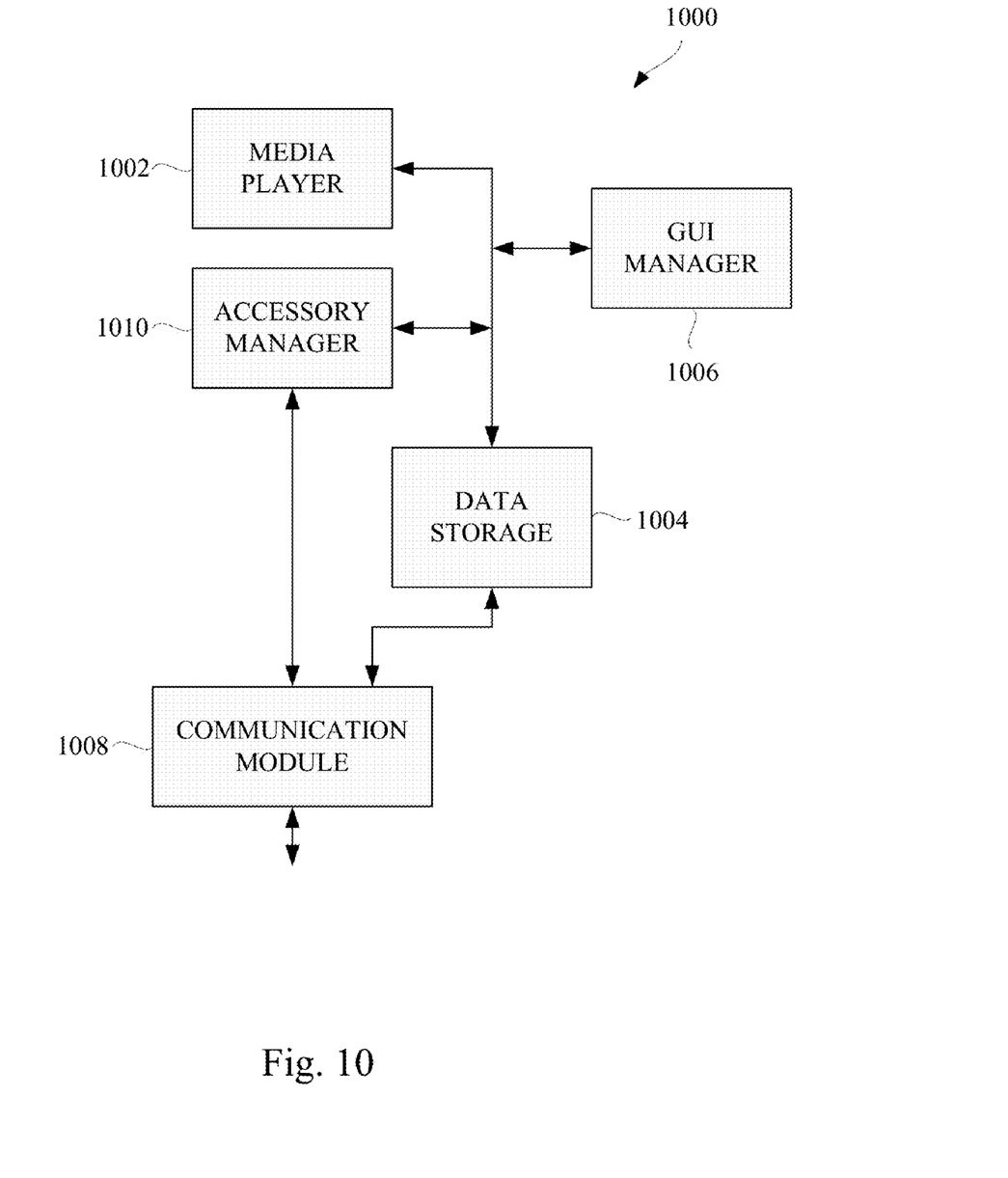
FIG. 10 is a block diagram of an arrangement of functional modules utilized by a portable media device.

FIG. 10 is a block diagram of an arrangement 1000 of functional modules utilized by a portable media device. The portable media device can, for example, be portable media device 102 illustrated in FIGS. 1 and 2. The arrangement 1000 includes a media player 1002 that is able to output media for a user of the portable media device but also store and retrieve data with respect to data storage 1004. The arrangement 1000 also includes a graphical user interface (GUI) manager 1006. The GUI manager 1006 operates to control information being provided to and displayed on a display device. The arrangement 1000 also includes a communication module 1008 that facilitates communication between the portable media device and an accessory device. Still further, the arrangement 1000 includes an accessory manager 1010 that operates to authenticate and acquire data from an accessory device that may be coupled to the portable media device. For example, the accessory device can be a wireless interface accessory, such as the wireless interface accessory 106 illustrated in FIG. 1 as being coupled to portable media device 102.

Figure 11:
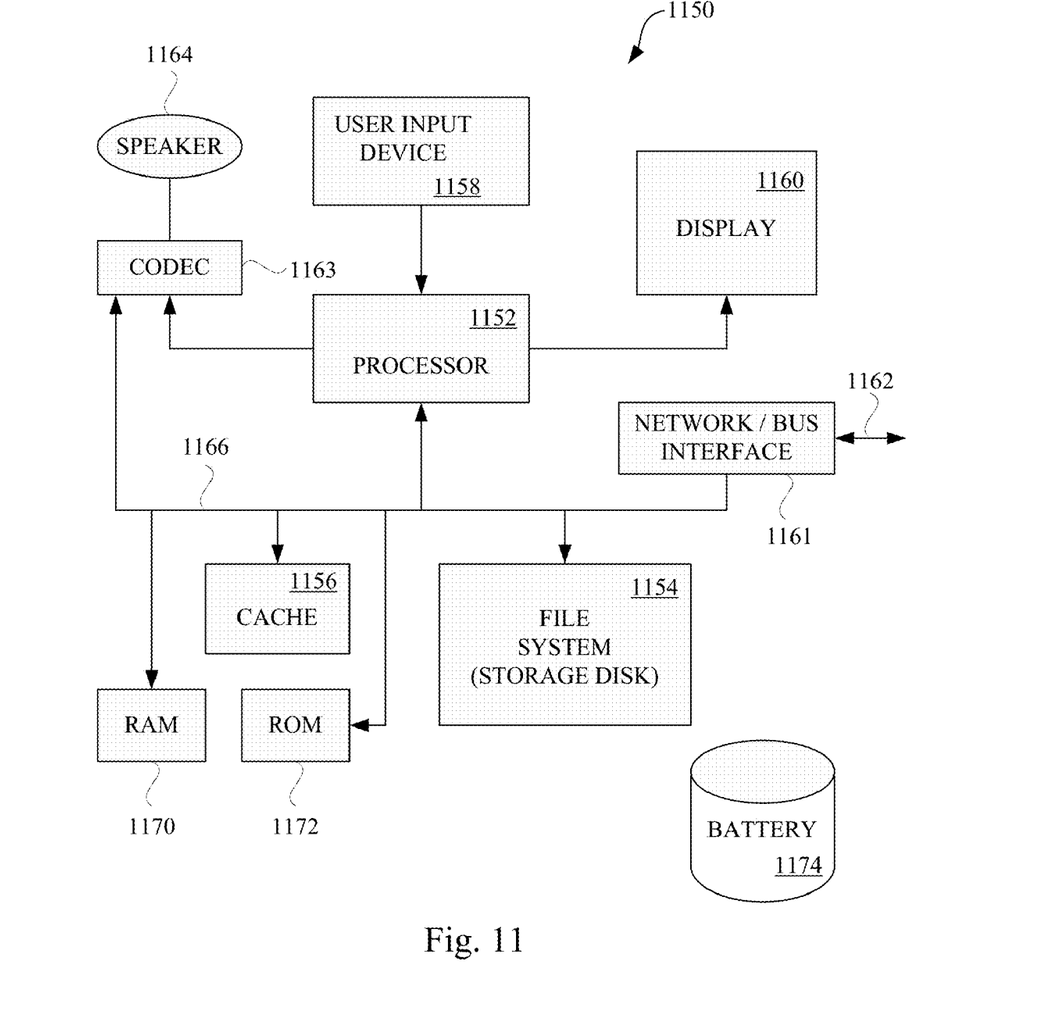
FIG. 11 is a block diagram of a media player suitable for use with the described embodiments.

FIG. 11 is a block diagram of a media player 1150 suitable for use with the described embodiments. The media player 1150 illustrates circuitry of a representative portable media device. The media player 1150 includes a processor 1152 that pertains to a microprocessor or controller for controlling the overall operation of the media player 1150. The media player 1150 stores media data pertaining to media items in a file system 1154 and a cache 1156. The file system 1154 is, typically, a storage disk or a plurality of disks. The file system 1154 typically provides high capacity storage capability for the media player 1150. However, since the access time to the file system 1154 is relatively slow, the media player 1150 can also include a cache 1156. The cache 1156 is, for example, Random-Access Memory (RAM) provided by semiconductor memory. The relative access time to the cache 1156 is substantially shorter than for the file system 1154. However, the cache 1156 does not have the large storage capacity of the file system 1154. Further, the file system 1154, when active, consumes more power than does the cache 1156. The power consumption is often a concern when the media player 1150 is a portable media device that is powered by a battery 1174. The media player 1150 can also include a RAM 1170 and a Read-Only Memory (ROM) 1172. The ROM 1172 can store programs, utilities or processes to be executed in a non-volatile manner. The RAM 1170 provides volatile data storage, such as for the cache 1156.

The media player 1150 also includes a user input device 1158 that allows a user of the media player 1150 to interact with the media player 1150. For example, the user input device 1158 can take a variety of forms, such as a button, keypad, dial, touch screen, audio input interface, video/image capture input interface, input in the form of sensor data, etc. Still further, the media player 1150 includes a display 1160 (screen display) that can be controlled by the processor 1152 to display information to the user. A data bus 1166 can facilitate data transfer between at least the file system 1154, the cache 1156, the processor 1152, and the CODEC 1163.

In one embodiment, the media player 1150 serves to store a plurality of media items (e.g., songs, podcasts, etc.) in the file system 1154. When a user desires to have the media player play a particular media item, a list of available media items is displayed on the display 1160. Then, using the user input device 1158, a user can select one of the available media items. The processor 1152, upon receiving a selection of a particular media item, supplies the media data (e.g., audio file) for the particular media item to a coder/decoder (CODEC) 1163. The CODEC 1163 then produces analog output signals for a speaker 1164. The speaker 1164 can be a speaker internal to the media player 1150 or external to the media player 1150. For example, headphones or earphones that connect to the media player 1150 would be considered an external speaker.

The media player 1150 also includes a network/bus interface 1161 that couples to a data link 1162. The data link 1162 allows the media player 1150 to couple to a host computer or to accessory devices. The data link 1162 can be provided over a wired connection or a wireless connection. In the case of a wireless connection, the network/bus interface 1161 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or video content.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A multi-pin connector assembly arranged to facilitate an electrical connection between an electronic device and an external circuit, wherein the multi-pin connector assembly engages a connector plug that has an electrically conductive body, comprising:

a top portion of the connector assembly having at least two contacts arranged to provide electrical connections to corresponding ground tabs on the electrically conductive body in the engaged state, and     a bottom portion of the connector assembly having at least two ground contacts formed of highly conductive material that protrude through a plastic body of the multi-pin connector assembly to make electrical contact with the electrically conductive body, wherein the multi-pin connector assembly is accommodated within an opening formed in a spline shaped housing of an electronic device having internal circuitry, wherein the top portion of the connector assembly engages more of the electrically conductive body of the connector plug than does the bottom portion of the connector assembly.

2. The multi-pin connector assembly as recited in claim 1, wherein in the engaged state, the multi-pin connector assembly mechanically engages the connector plug to form an electrical connection between the internal circuitry of the electronic device and the external circuit.

3. The multi-pin connector assembly as recited in claim 2, wherein the at least two ground contacts take the form of having a base portion and a raised portion that comes in contact with the electrically conductive body in the engaged state.

4. The multi-pin connector assembly as recited in claim 3, wherein the at least two ground contacts are formed of any of stainless steel and copper.

5. The multi-pin connector assembly as recited in claim 1, wherein the multi-pin connector assembly includes at least 30 electrical contacts that form the electrical connection.

6. A personal media device, comprising:
a housing having at least a highly curved portion wherein the housing includes at least one opening in the highly curved portion; and
a multi-pin connector assembly in the at least one opening of
a top portion of the multi-pin connector assembly having at least two contacts arranged to provide ground contact to a conductive shell of a connector plug in an engaged state, and
a bottom portion of the multi-pin connector assembly having at least two ground contacts formed of highly conductive material that protrude through a plastic body of the multi-pin connector assembly causing the at least two ground contacts to make electrical contact with the conductive shell of the connector plug, wherein the top portion engages more of the connector plug of the electronic device than does the bottom portion.

7. The personal media device as recited in claim 6, wherein in an engaged state, the multi-pin connector assembly mechanically engages the connector plug to form an electrical connection between internal circuitry of the electronic device and an external circuit.

8. The personal media device as recited in claim 7, wherein the at least two ground contacts take the form of having a base portion and a raised portion that comes in contact with the conductive shell in the engaged state.

9. The personal media device as recited in claim 8, wherein the at least two ground contacts are formed of any of stainless steel and copper.

10. The personal media device as recited in claim 6, wherein the multi-pin connector assembly includes at least 30 electrical contacts that form the electrical connection.

11. A method of manufacturing an electronic device, comprising:
providing a housing having at least a highly curved portion;
forming at least one opening in the highly curved portion of the housing suitably sized to accommodate a multi-pin connector;
providing the multi-pin connector assembly;
inserting the multi-pin connector assembly into the opening; and
securing the multi-pin connector to the highly curved portion of the housing, wherein the multi-pin connector has a size and shape arranged to mechanically engage a connector plug in an engaged state to form an electrical connection between internal circuits in the electronic device and an external circuit, the connector plug having an electrically conductive body for providing a ground, wherein the multi-pin connector comprises:
a top portion having at least two contacts arranged to provide electrical connections to corresponding ground tabs on the electrically conductive body of the connector plug in the engaged state, and
a bottom portion having at least two ground contacts formed of highly conductive material that protrude through a plastic body of the multi-pin connector assembly causing the at least two ground contacts to make electrical contact with the electrically conductive body of the connector plug, wherein the top portion engages more of the connector plug than does the bottom portion.

12. The method as recited in claim 11, wherein the at least two ground contacts take the form of having a base portion and a raised portion that comes in contact with the electrically conductive body in the engaged state.

13. The method as recited in claim 12, wherein the at least two ground contacts are formed of any of stainless steel and copper.

* * * * *